United States Patent Office 3,328,144
Patented June 27, 1967

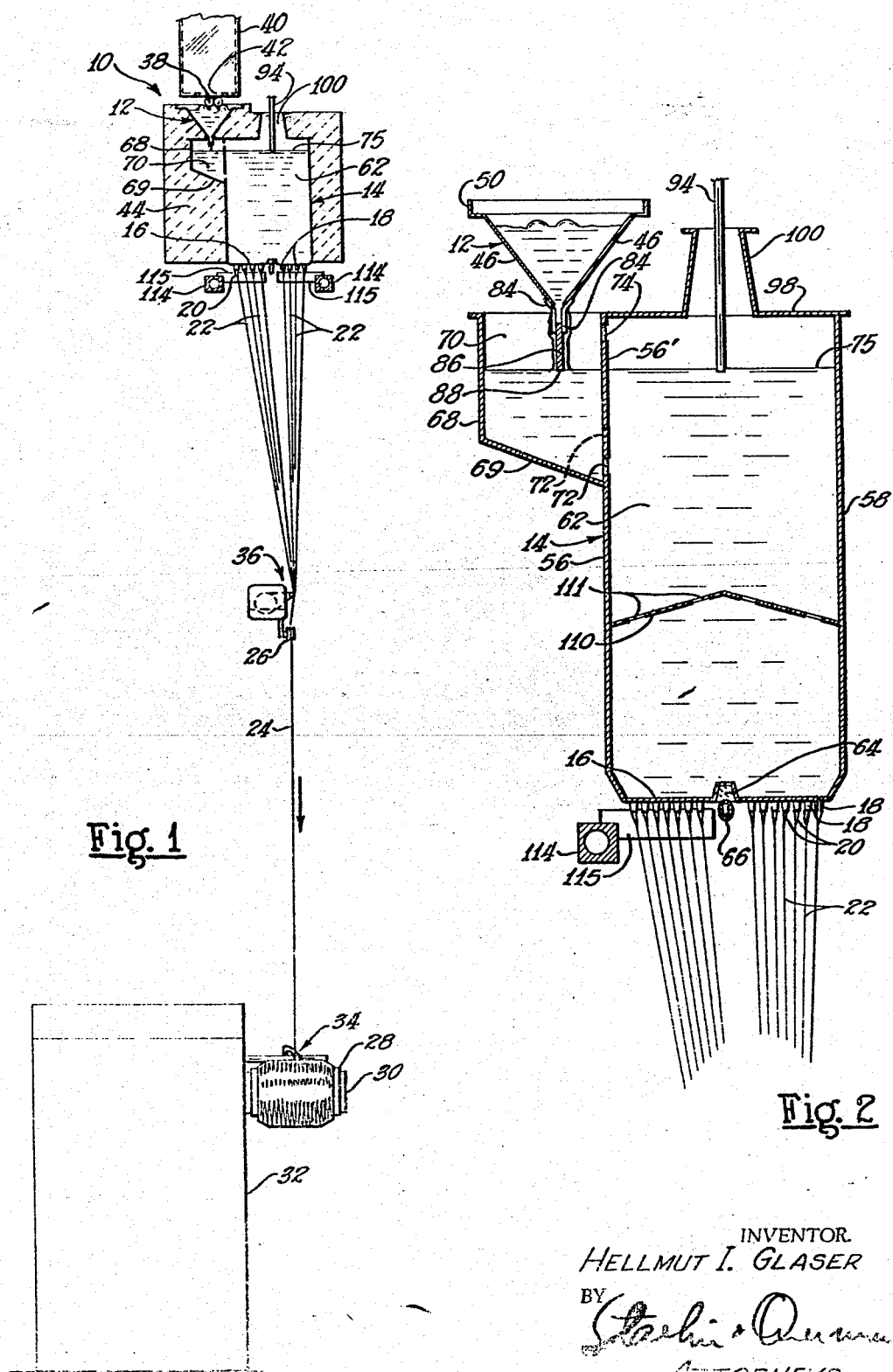

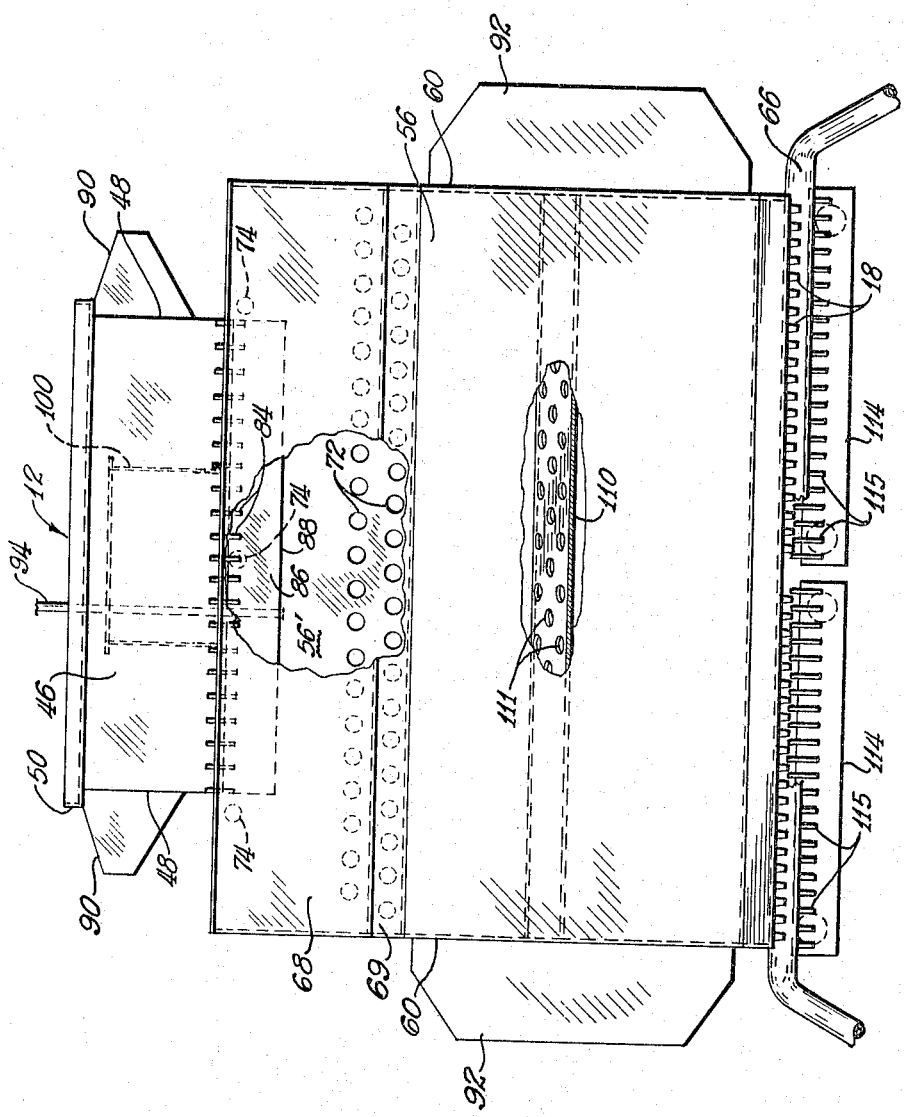

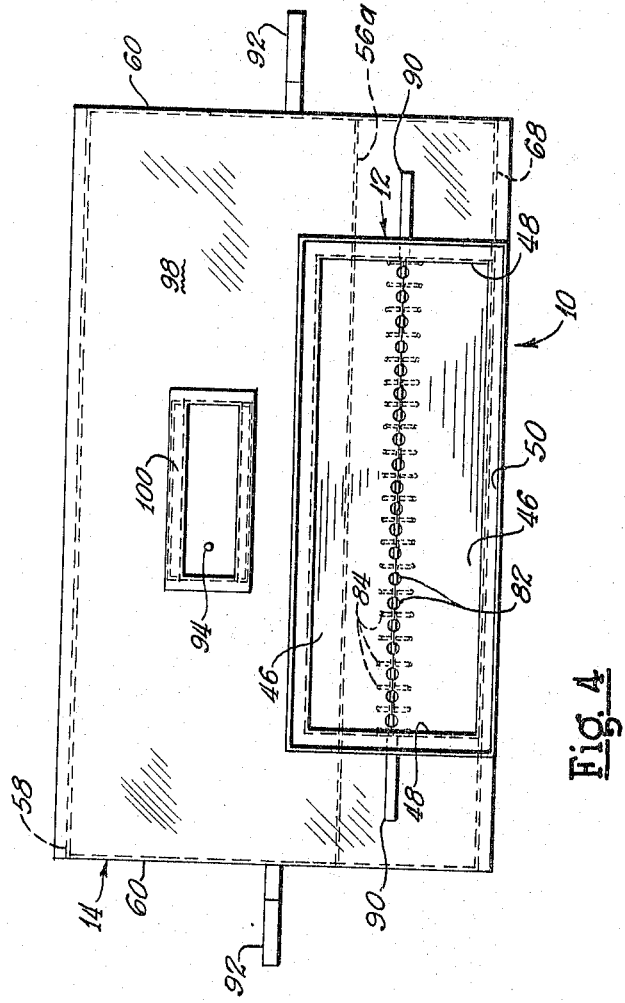

3,328,144
APPARATUS FOR MELTING AND PROCESSING HEAT-SOFTENABLE MINERAL MATERIALS
Hellmut I. Glaser, Anderson, S.C., assignor to Owen-Corning Fiberglas Corporation, a corporation of Delaware
Filed June 29, 1964, Ser. No. 378,615
8 Claims. (Cl. 65—11)

The present invention relates to a method of and apparatus for melting heat-softenable mineral materials, thermally conditioning and refining the molten material and feeding streams of the material of a character that may be attenuated to fine textile filaments.

Recent developments have been made in melting glass and delivering the molten glass into a bushing or stream feeder wherein the molten glass is maintained for a substantial period of time to condition the glass prior to its delivery in a plurality of streams attenuated to fine textile filaments. In methods of this character it has been a practice to feed a prerefined mineral material such as glass in the form of pieces or marbles into a melting zone of a stream feeder or bushing, the molten glass moving vertically downwardly in the bushing to the stream delivery section.

The melting takes place at the surface region of the molten glass and the melt at this region is at a comparatively high viscosity. The viscous glass tends to impede the effluence or escape of gases in the melt and "seeds" tend to remain in the melt, a condition which fosters filament breakouts, particularly in the production of filaments of sizes under seventeen hundred thousandths inch in diameter where several hundred filaments are being simultaneously attenuated from a like number of streams flowing from the tip section of the bushing. Filament breakouts necessitate interruption of attenuating operations to effect a restart, and the "downtime" necessarily increases the cost of producing fine textile filaments.

The present invention embraces a method of melting glass or other heat-softenable filament-forming mineral material and heat conditioning and refining the melt under conditions fostering the effluence or escape of gases within the melt and reducing seed formation in the melt.

Another object of the invention resides in the provision of a method of melting the glass in a region laterally offset from the central zone of the feeder providing a comparatively large unimpeded surface area of the molten glass in the stream feeder or bushing to permit and promote the effluence of gases from the melt to improve the homogeneity and quality of the glass prior to its delivery from the bushing.

Another object of the invention resides in the provision of a method of melting the glass at a region spaced laterally from a central region of a bushing, the bushing being configurated to provide a comparatively long residence time for the glass in a heat conditioning environment to foster the movement of the molten glass in laminar planes whereby the glass flows or moves downwardly without channeling at a comparatively low rate and substantially uniformly throughout the area of the bushing to the delivery zone or tip section.

Another object of the invention is the provision of a method of melting glass or other filament-forming mineral material in a region offset from a central region of a stream feeder or bushing and flowing the molten glass or material into the offset region in a manner to avoid turbulence and thermal shock in the glass in the feeder.

Another object of the invention resides in a method of flowing glass or other material from a melting zone into an offset region of a feeder zone in film form in a manner effecting improved distribution of the glass in the offset region of the feeder zone.

Another object of the invention resides in a stream feeder and melter arrangement wherein the melter and the region of delivery of molten glass from the melter into the bushing or stream feeder is offset from the major body of glass in the bushing wherein baffle means are provided for effecting uniform distribution of glass delivered into the bushing.

Another object of the invention resides in an arrangement for flowing or conducting molten glass from a melter to an offset region of a bushing involving the use of means depending from the melter to approximately the level of the glass in the bushing to promote flow of the glass in film form wherein the means is electrically energized to maintain or increase the temperature of the glass during its traverse from the melter into the bushing.

Another object of the invention resides in a stream feeder or bushing having a lateral offset portion or portions providing an enlargement accommodating a substantial increase in the volume of glass in the bushing whereby the glass moves downwardly at a comparatively low rate thereby increasing the residence time of the glass in the bushing to attain a highly refined glass with a consequent reduction of filament breakouts and a substantial increase in the production of textile filaments.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-schematic elevational view of a melter and bushing or stream feeder arrangement of the invention for processing mineral material in association with means for attenuating filaments from the material;

FIGURE 2 is a transverse sectional view illustrating the melter and bushing shown in FIGURE 1;

FIGURE 3 is a side elevational view of the construction shown in FIGURE 2, a portion of the bushing being shown in section;

FIGURE 4 is a top plan view of the feeder and melter shown in FIGURE 2;

Figure 5:
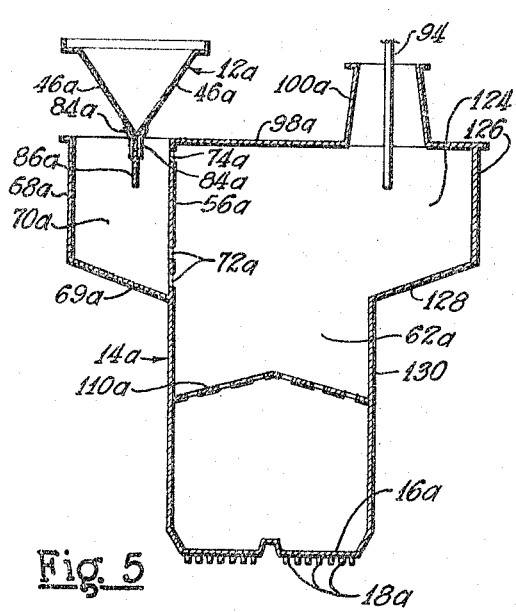
FIGURE 5 is a view similar to FIGURE 2 illustrating a modified form of bushing.

While the method and apparatus of the invention have particular utility in melting, heat-conditioning and processing glass for forming extremely fine continuous textile filaments, it is to be understood that the method and apparatus of the invention may be utilized for conditioning and processing other heat-softenable mineral materials wherever the invention may be found to have utility.

Referring to the drawings in detail and initially to FIGURE 1, the form of the apparatus illustrated is especially adaptable for melting, conditioning and processing glass suitable for attenuation to extremely fine continuous filaments for forming textile strands, threads or yarns. The arrangement comprises a melter and bushing or stream feeder construction 10 for melting and heat-conditioning glass for delivery as streams through orificed projections provided in the floor or tip section of the bushing.

The arrangement includes a melter or melting chamber 12 and a stream feeder or bushing 14 which receives heat-softened or molten glass or other heat-softenable fiber-forming mineral material from the melter. The floor or tip section 16 of the feeder 14 is fashioned with one or more groups of orificed projections 18 through which flow streams of glass 20 and the streams attenuated to fine continuous filaments 22.

The continuous filaments 22 are attenuated by mechanical attenuation and, in the arrangement illustrated, are converged to form a multi-filament strand 24 through the medium of a gathering shoe 26, the strand 24 being wound upon a collector or collecting surface, such as a tubular sleeve 28, telescoped upon a mandrel or collet 30 driven by suitable motive means (not shown) contained in a housing 32 of a winding machine of conventional construction.

During winding of the strand 24 upon the collector 28, the strand is distributed lengthwise of the collector 28 by a traverse means 34 to build up a strand package of superposed layers of the strand, the traverse 34 being engaged with the strand and arranged to oscillate the stand as it is wound on the collector in order to effect a crossing of successive convolutions of strand on the collector to prevent adjacent convolutions of strand from adhering together. A lubricant, size or other coating material may be applied to the filaments at a region prior to the convergence of the filaments into a strand by engaging the filaments with an applicator 36 of conventional character.

As shown in FIGURE 1, the melter 12 is arranged to receive pieces of glass, such as preformed marbles of refined glass 38, from a supply contained in a hopper or receptacle 40. The discharge region 42 of the hopper is arranged with respect to the melter whereby the glass marbles 38 move downwardly by gravity into the melter replacing the heat softened or molten glass in the melter flowing into the feeder or bushing. The rate of melting of the glass is automatically controlled dependent upon the rate of delivery of streams of glass from the bushing. The melter unit and the stream feeder or bushing unit are surrounded by refractory 44.

FIGURES 2 through 4 particularly illustrate one form of melter unit and stream feeder or bushing unit of the invention. The melter unit 12 of the arrangement is generally V-shaped in cross section comprising convergingly arranged side walls 46 and end walls 48, the upper region of the melter being fashioned with a rectangularly-shaped flange 50 reinforcing the melter construction. The melter 12 is disposed laterally of or offset from the central vertical plane of the stream feeder or bushing 14 in the manner shown in FIGURES 1, 2 and 4, and is electrically insulated from the stream feeder or bushing by refractory or other insulating material.

The feeder or bushing 14 is generally rectangular in cross section and comprises side walls 56 and 58 and end walls 60 defining a glass conditioning chamber, main section or region 62. The floor 16 of the feeder is provided with a central recess extending lengthwise thereof accommodating a block or member 64 of refractory. Disposed lengthwise beneath and in engagement with the block 64 is a metal tube 66 through which fluid, such as water, is circulated to cool the tube 66, the tube providing a central longitudinal support for the floor of the feeder or bushing to resist or prevent sagging of the floor or tip section.

The stream feeder or bushing 14 is fashioned with a laterally offset portion forming an enlargement at the upper region of the bushing defined by an outer side wall 68, an angularly disposed bottom wall 69, the end walls of the offset enlargement being lateral continuations or extensions of the end walls 60 of the feeder section.

An inner wall 56' of the offset region is preferably an integral part of the bushing wall 56, the walls 68 and 56' defining an offset section, supplemental chamber or region 70 into which the molten material is delivered from the melter 12.

The wall portion 56' of the feeder wall 56, in the embodiment illustrated in FIGURES 1 through 4, provides a baffle between the region 70 and the main chamber 62 of the bushing and is provided with rows of lengthwise spaced openings 72 to facilitate flow of the heat-softened or molten glass in the auxiliary chamber 70 into the main feeder chamber 62. The upper region of the wall portion or baffle 56' is provided with vent openings 74 arranged above the level of the molten glass in the feeder, indicated at 74.

The melter arrangement is provided with means to facilitate delivery of heat-softened or molten glass from the melting chamber 12 into the supplemental chamber 70 of the stream feeder whereby the glass flows in film form into the feeder or bushing without causing appreciable turbulence or thermal disturbance of the molten glass in the feeder.

The apex region provided at the convergence of the melter walls 46 is fashioned with a plurality of lengthwise spaced orifices or outlets 82, particularly shown in FIGURE 4. Welded or otherwise secured to the terminal regions of the walls 46 and between the pairs of openings 82 are depending wires, rods or members 84, a lengthwise row or group of wires being supported by each wall of the melter. Welded to the depending regions of the rods 84 and disposed lengthwise between the two groups of rods is a member or plate 86, the lower edge 88 of the plate 86 preferably terminating slightly beneath the normal level 75 of the glass in the feeder.

The glass from the melter 12 flows through the openings 82, and the spaced rods or wires 84 provide baffles or guides to maintain uniform flow distribution of the glass lengthwise of the melter into the feeder. The plate or bar 86 provides a means along which the glass may flow into the feeder in the form of a thin film or films so that the glass from the melter enters into the glass in the feeder without appreciable turbulence. The plate 86 is a current conductor and electric current flow through the plate maintains the film or films of glass at a high temperature during its transfer from the melter into the feeder.

The bushing 14 and the melter 12 are electrically heated through independent circuits. Secured to each end wall 48 of the melter 12 is a terminal 90, and secured to each end wall of the stream feeder or bushing 14 is a terminal 92.

The melting of the marbles of glass in the melter 12 must be controlled at a rate to continuously replenish the supply of molten glass in the feeder bushing equal to the amount discharged through the orifices in the tip section or floor of the bushing 14.

In the embodiment illustrated, the current supplied to the melter is controlled by the level of the molten glass in the bushing through a probe arrangement, one of the probes 94 extending into the bushing 14, as shown in FIGURES 2 and 3. The bushing 14 is provided with a cover member 98 having a walled vent 100 to facilitate escape of gases from the feeder bushing and to accommodate the probe construction 94.

Figure 8:
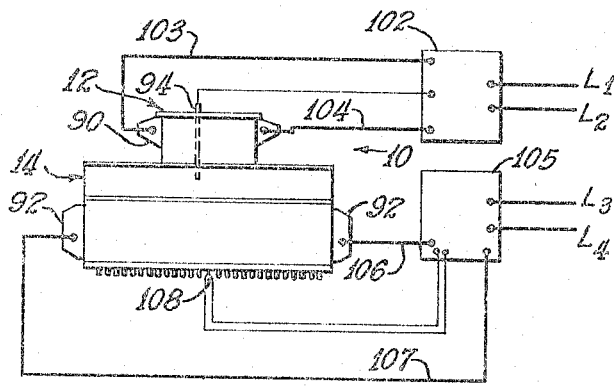
FIGURE 8 is a schematic diagram of the circuits and controls for the melter and bushing.

FIGURE 8 is a schematic diagram of the control means for electric current supplied to the melter and the bushing. A control 102 for regulating the flow of electric energy through the melter 12 is provided which is connected by leads 103 and 104 with the terminals 90 at the ends of the melter unit 12. The control 102 receives electric energy from a supply through conductors L1 and L2. The probe construction 94 is connected with the control means 102, the control means being of a character whereby the probe construction senses the level of molten glass in the bushing 14 and influences the control 102 to regulate or modify current supplied to the melter to increase or decrease the melting rate as determined by minute variations in the level of glass in the bushing.

The bushing 14 is connected with a control 105 by conductors 106 and 107 engaging the terminals 92 at the ends of the bushing 14, the control 105 being connected with a current supply by conductors L3 and L4. A thermocouple 108, responsive to temperature in the feeder, is connected with the control 105 to regulate or control the heating of the molten glass in the bushing. Control means of this character adaptable for the melter and stream feeder or bushing is shown and described in my Patent 3,048,640 granted Aug. 7, 1962.

A current conductor or heater screen 110 is disposed lengthwise of the chamber 62 of the feeder or bushing 14 having openings 111 through which glass flows downwardly to the tip section. The ends of the screen 110 are welded or otherwise joined to the end walls 60 of the bushing and provides an electrically energizable heating means for transferring heat to the glass in the bushing. Through the use of the heater screen 110 the glass adjacent the screen is at the highest temperature in any area of the bushing.

The heat transferred to the glass by the heater 110, which raises the glass adjacent the screen to a higher temperature, accelerates the effluence or escape of gases in the glass, causing the gases to move upwardly for discharge through the vent 100, thus effecting further refinement of the glass.

The temperature of the glass below the heater screen 110 gradually decreases as the glass moves downwardly, a condition which promotes vertical flow profile of the glass in laminar planes to further refine the glass, rendering it more homogeneous, and thereby improving the condition of the glass for attenuation to fine textile filaments.

As the rate of softening or melting of glass in the melter 12 is controlled by the level of the glass in the bushing, the head of glass in the stream feeder or bushing 14 is maintained substantially constant so that there is no appreciable variation in the head of glass which would affect variation in stream flow through the orificed projections 18. It should be noted that the stream feeder or bushing 14 is of substantial depth in order to maintain a comparatively large amount of glass in the main bushing chamber 62 and the supplemental chamber 70.

The bushing chamber 62 is comparatively narrow in order to maintain temperature control at the central region of the glass in the bushing as otherwise laminar flow will be impaired. By providing a substantial amount of glass in the bushing, sufficient residence time is provided for the glass to promote effective refining and heat-conditioning of the molten glass to promote movement of the glass in laminar planes so that molten glass at the region of the delivery orifices is of uniform temperature and substantially homogeneous so that the same amount of throughput is had through each of the orifices.

Another feature provided by the delivery of glass from a melter into a region laterally offset from the control region of the bushing is that a substantially greater quantity of glass is contained within the main chamber of the bushing, thereby prolonging the residence time of the glass in the bushing. Another feature of the laterally disposed region of the bushing receiving glass from the melter is that a proportionately larger unimpeded surface area is provided to facilitate effluence or escape of gases from the molten glass to attain a more refined glass and reducing the tendency of seed formation.

The material of the feeder bushing 14 including the walls of the supplemental chamber 70, the melter 12, the wires 84, the bar 86 and the heater screen 110 are fashioned of metal or metal alloy capable of withstanding the intense heat of the molten glass or other mineral material. Alloys of platinum and rhodium have been found to be satisfactory for the purpose.

In order to promote flow from the orificed projections 18 of streams of glass of uniform size and characteristics, the molten glass in the feeder bushing 14 is maintained at a temperature above an attenuating range, providing a low viscosity or liquidus glass to be delivered through the orifices. As a highly liquid glass is of too low a viscosity for satisfactory attenuation, an arrangement is provided adjacent the delivery regions of the streams to increase and stabilize the viscosity of the glass of the streams to facilitate attenuation.

As shown in FIGURES 2 and 3, there is disposed lengthwise of the feeder adjacent the tip section, tubular manifolds 114 for accommodating circulating heat absorbing fluid such as water. Welded or otherwise joined to each manifold is a plurality of heat transferring fins or members 115.

As particularly shown in FIGURE 3, a fin or member 115 is disposed between the transverse rows of projections or tips 18 to absorb or withdraw heat from the streams of glass, thereby increasing the viscosity of the glass of the streams to a satisfactory attenuating temperature or condition.

While in the embodiment illustrated, a fin or member 115 is provided between each pair of transverse rows of projections, it is to be understood that one fin may extend between alternate pairs of rows of projections if desired.

Thus, in the arrangement shown in FIGURES 1 through 4, the pieces or marbles of glass or other filament-forming mineral material are heat-softened or melted in a melter 12 at a region offset laterally from the central plane of a feeder bushing, facilitating delivery of molten glass into the bushing in a region remote from the stream delivery tips 18 in the floor of the bushing, the arrangement providing for a comparatively long residence time for the glass in the bushing prior to its delivery through the orificed tips.

The arrangement of the heater screen 110 in the feeder heat-conditions the glass to promote the eradication or effluence of gases from the molten glass and hence minimizes the tendency for seed formation.

The heating of the bar or plate 86 stabilizes the temperature of the glass flowing from the melter into the feeder, and the method of flowing the glass into bushing minimizing turbulence and thermal disturbance of the glass in the bushing. The gas bubbles rising through the melt in the bushing 14 agitate or stir the glass and assist in further refining the glass.

The heater screen 110 in the form shown in FIGURE 2, is preferably disposed slightly below the mid region of the stream feeder. It is desirable to position the heater screen 110 in the melt to secure the most efficient refining of the glass and effectively promote the eradication of gases in the melt. The positioning of the screen is, in a measure, dependent upon the rate of throughput of glass through the orificed projections 18.

Thus, if the throughput is comparatively high, it has been found advantageous to dispose the screen 110 at a greater distance above the floor of the feeder in order to effectively increase the temperature of the glass at a higher region in the bushing to heat-condition the greater volume of glass at a region above that illustrated in FIGURE 2 in order to effectively refine the higher volume of glass.

FIGURE 5 illustrates a modified form of stream feeder or bushing 14a associated with a melter 12a. In this form, the bushing 14a is provided with a first laterally offset portion defined by walls 68a and a slanted bottom wall 69a providing the auxiliary or supplemental chamber 70a which receives molten glass from the melter 12a.

The wall portion of baffle 56a is provided with openings 72a facilitating flow of molten glass from the auxiliary chamber 70a into the major chamber region 62a of the bushing.

The wall 56a is provided at its upper region with vent openings 74a to equalize pressures above the glass in the main feeder chamber 62a and the auxiliary or offset chamber 70a. The floor 16a of the bushing, providing the tip section, is provided with orificed tips 18a through which streams of glass flow from the bushing for attenuation to continuous filaments. A heater screen 110a is disposed in and extends lengthwise of the feeder 14a.

In the form of construction shown in FIGURE 5, the stream feeder or bushing is provided with a second lateral region 124 extending in a direction opposite to the laterally disposed chamber 70a and is defined by a vertical wall portion 126 and a slanted bottom wall or floor 128 joined with a side wall 130 of the bushing 14a. In this form, the vent stack 100a mounted on the cover 98a is disposed over the second laterally offset region 124 to facilitate escape of gases emanating from the molten glass in the bushing.

In the arrangement shown in FIGURE 5, the dual lateral offset regions 70a and 124 provide for an increased volume of molten glass in the bushing whereby the residence time of the glass in the feeder is increased for the same throughput through the orificed projections 18a.

This arrangement enables an increase in throughput yet maintaining the residence time substantially the same as that of the form shown in FIGURE 2 with the single offset region. Another advantage of the dual offset construction is that it provides a substantial increase in the surface area of the molten glass in the bushing to thereby further enhance the effluence of gases from the glass.

Figure 6:
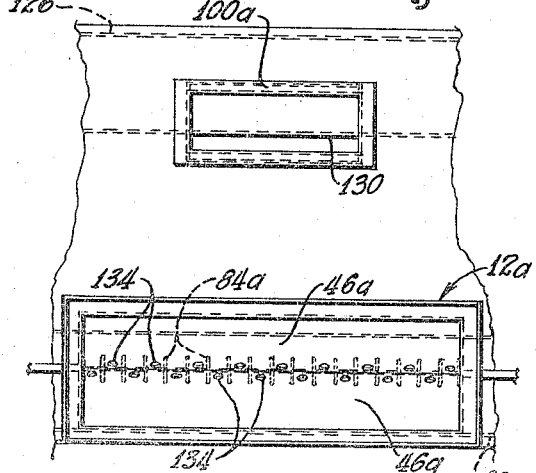
FIGURE 6 is a top plan view of the melter and a portion of the bushing shown in FIGURE 5.

FIGURE 6 is a fragmentary plan view of the melter and a portion of the bushing shown in FIGURE 5. In this form of melter, the apex region defined by the convergingly arranged walls 46a is provided with glass delivery outlets 134. The outlets or openings 134 are arranged in two rows, the rows being offset at each side of a medium plane through the apex of the melter and through which the heat-softened or molten glass flows into the chamber 70a along the bar 86a at regions between the wires or baffles 84a.

The wire baffle means 84a tend to effect more uniform delivery of glass from the melter throughout its length. As shown in FIGURE 6, the openings 134 in each of opposite rows are staggered lengthwise of the melter so as to promote the delivery of the glass into the chamber 70a in two films along opposite faces or sides of the bar or guide 86a, shown in FIGURE 5.

Figure 7:
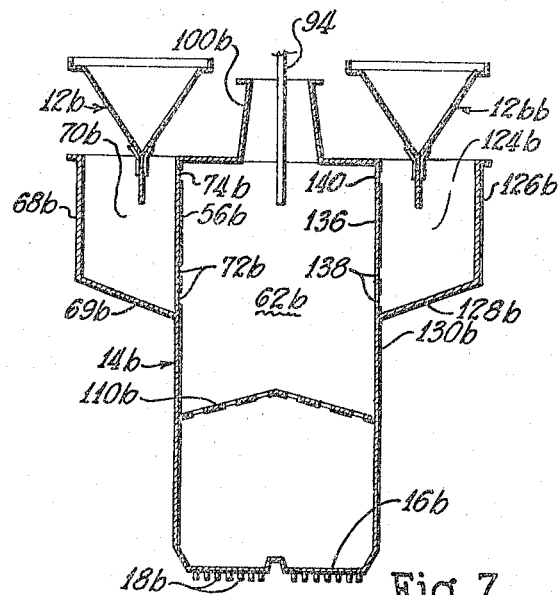
FIGURE 7 illustrates a modified form of feeder construction associated with dual melter units.

FIGURE 7 illustrates a modified arrangement of stream feeder or bushing associated with dual melting units. In this form, the bushing 14b is of the same configuration as the bushing 14a shown in FIGURE 5.

The bushing includes a first laterally offset region 70b defined by an outer wall 68b, a slanted wall 69b, and a partition 56b provided with glass flow openings 72b and vent openings 74b. Extending lengthwise of the feeder is a heating screen 110b and the floor or tip section 16b of the feeder which is provided with orificed projections 18b through which flow streams of glass from the feeder for attenuation to filaments.

The bushing is provided with a second laterally offset region 124b on the opposite side of the feeder from the laterally offset region 70b, the offset region 124b being defined by an outer side wall 126b and a slanted bottom wall 128b. A second partition 136, provided by an extension of the feeder wall 130b, is fashioned with openings 138 to facilitate glass flow from the auxiliary or supplemental offset region 124b to the central region 62b of the bushing, the partition 136 being formed at its upper region with vent openings 140.

In this arrangement, a first melter 12b is disposed above the laterally offset region 70b of the bushing and is arranged to deliver molten glass or other fiber-forming material into the region 70b. A second melter 12bb is disposed above the second offset region 124b and is arranged to deliver molten glass into the second offset region 124b of the bushing.

In this form of construction, the vent 100b is disposed above the central region of the main chamber 62b of the bushing to convey away gases driven out of the melt in the bushing. The melters 12b and 12bb may be of the character shown at 12 in FIGURE 2, or of the character shown at 12a in FIGURES 5 and 6. The construction shown in FIGURE 7 provides a large surface area of glass in the bushing to facilitate the effluence or escape of gases in the glass and provides for a high melting rate through the use of the dual melter system where a high throughput of glass is desired.

In all forms of the invention disclosed, the glass is melted and delivered into a stream feeder or bushing at a region laterally offset from a central longitudinal plane through the bushing whereby the glass from an offset region flows generally laterally into the main feeder or bushing chamber providing a comparatively large surface area for the glass in the bushing to enhance the disposal of gases from the molten glass.

Furthermore, the forms of the invention accommodate an increased volume of glass, as compared with feeders heretofore employed without offset regions, whereby a large volume of glass and hence a long residence time for the glass is provided in the bushing and without impeding the free effluence of gases out of the glass.

The melter arrangements facilitate delivery of the glass from the melter into the bushing section with little or no turbulence in the glass in the bushing so that the thermal profile in the feeder bushing may be maintained.

The arrangements provide for effectively heat-conditioning the glass in the stream feeder or bushing to reduce or lower the tendency for formation of seeds in the glass. The comparatively long residence time for the glass in the bushing enables improved refining of the glass whereby the streams of glass flowing from the tip section are of uniform character fostering a reduction in filament breakouts during attenuation of the streams to filaments. In the forms of feeder construction, a constant amount of glass is maintained therein by a sensing probe construction 94 and current control associated therewith.

It is to be understood that the feeder or bushing construction of the invention may be supplied with heat-softened material, such as glass, delivered into the offset region or regions from a forehearth or other supply.

It is apparent that, within the scope of the invention, modifications and different arrangements may be made other than as herein disclosed, and the present disclosure is illustrative merely, the invention comprehending all variations thereof.

I claim:

1. Apparatus for processing glass for attenuation to fine filaments including, in combination, a stream feeder having a comparatively narrow main central section of substantial depth and an offset section of lesser depth than the main section, means arranged to deliver molten glass from a supply into the offset section, wall means disposed between the main feeder section and the offset section having an open area near the bottom of the offset section whereby the molten glass in the offset section flows generally laterally through the open area into the main feeder section, a heater strip disposed in the main feeder section adapted to be electrically heated to increase the temperature of the glass adjacent the heater strip, the floor of the feeder having a plurality of orifices through which flow streams of glass from the feeder.

2. Apparatus for processing glass for attenuation to filaments including, in combination, a stream feeder having a comparatively narrow main central section of substantial depth and a laterally extending supplemental section, said supplemental section being arranged to receive molten glass from a supply, wall means disposed between the main feeder section and said supplemental section having an open area substantially below the surface of the glass in said sections whereby the molten glass flows through the open area generally laterally from the supplemental section into the main feeder section, and a perforated heater strip disposed in the main feeder section adapted to be electrically heated to increase the temperature of the glass adjacent the heater strip, the floor of the feeder having a plurality of orificed projections through which streams of glass flow from the feeder.

3. Apparatus for processing glass for attenuation to fine filaments including, in combination, a stream feeder having a comparatively narrow main central section of substantial depth and a laterally extending supplemental section, a melter disposed above said laterally extending supplemental section arranged to deliver molten glass into the supplemental section, wall means disposed between the main feeder section and said supplemental section having at least one opening substantially below the surface of the glass in the sections whereby the molten glass in said supplemental section flows through the opening into the main feeder section, and a perforated heater strip disposed in the main feeder section adapted to be electrically heated to increase the temperature of the glass adjacent the heater strip, the floor of the feeder having a plurality of orificed projections through which flow streams of glass from the feeder.

4. Apparatus for processing heat-softened mineral material comprising a stream feeder having a walled main section of comparatively narrow width and of a depth substantially greater than its width, said feeder having a supplemental section offset laterally from the main section, said supplemental section arranged to receive heat-softened material from a supply, the wall between the main section and the supplemental section having an open area substantially below the surface of the glass in said sections whereby the molten glass in the supplemental section flows from the supplemental section through the open area into the main section, the floor of the main section having a plurality of orifices through which are discharged streams of the material, said feeder being arranged to be heated by electric current, a current conducting strip disposed in the main section and extending lengthwise of the feeder at a region lower than the supplemental section whereby to establish a zone of highest temperature of the material in the main section adjacent the current conducting strip to promote effluence of gases from the material.

5. Apparatus for processing heat-softenable mineral material including, in combination, a stream feeder having a first region of substantial depth and of comparatively narrow width, said feeder having a floor area provided with a plurality of orifices for the discharge of streams of the flowable mineral material, said feeder having a second region laterally offset with respect to the first region, said offset region arranged to receive heat-softened material from a supply, wall means disposed between the first and second regions having an open area substantially below the surface of the heat-softened material in said sections whereby the softened material in the second region flows through the open area into the first region of the stream feeder means for electrically heating the stream feeder including a current conducting strip in said stream feeder extending lengthwise thereof, a vent for said stream feeder for the escape of gases from the material in the feeder, means for sensing the amount of material in the feeder, and means responsive to said sensing means for controlling the rate of delivery of heat-softened material from the supply into the offset region of the feeder to maintain substantially constant the amount of material in the feeder.

6. Apparatus for processing glass including, in combination, a walled melter, means for electrically heating the melter to reduce the glass to a flowable condition, a stream feeder having a first section of substantial depth and of comparatively narrow width, said feeder having a laterally extending supplemental section of lesser depth than the main section, said melter being disposed above the supplemental section, said melter having an apex region provided with glass delivery outlet means, a first current conducting metal strip, an edge region of the strip terminating adjacent the level of the glass in the feeder, wall means between said sections having an open area near the bottom of the supplemental section whereby molten glass in the supplemental section flows through the open area into the first section, means for electrically heating the stream feeder independently of the melter including a second current conducting metal strip in said stream feeder extending lengthwise thereof at a zone lower than the supplemental section, means for sensing the amount of glass therein, and means responsive to said sensing means for controlling the electric current flow to the melter for regulating the rate of melting of the glass to maintain substantially constant the amount of glass in the stream feeder.

7. Apparatus for processing glass including, in combination, a walled melter, means for electrically heating the melter to reduce the glass to a flowable condition, a stream feeder having a first section of substantial depth and of comparatively narrow width, said feeder having a laterally extending supplemental section of lesser depth than the main section, said melter being disposed above the supplemental section, said melter having an apex reggion provided with a plurality of lengthwise spaced glass delivery outlets, a plurality of lengthwise spaced baffles secured to the walls of the melter, a current conducting metal strip secured to said baffles, an edge region of the strip terminating adjacent the level of the glass in the feeder, wall means between the first section and the supplemental section of the feeder having an open area substantially below the surface of the glass in said section whereby the molten glass in said supplemental section flows through the opening into the first section, means for electrically heating the stream feeder independently of the melter including a perforated current conducting metal strip in said stream feeder extending lengthwise thereof at a zone lower than the supplemental section, a cover for the feeder having a vent for the escape of gases from the glass in the feeder, means for sensing the amount of glass therein, and means responsive to said sensing means for controlling the electric current flow to the melter for regulating the rate of melting of the glass to maintain substantially constant the amount of glass in the stream feeder.

8. Apparatus for processing glass for attenuation to fine filaments including, in combination, a stream feeder having a comparatively narrow main central section of substantial depth and opposed laterally extending supplemental sections, means for feeding molten glass from a supply into each of the supplemental sections, wall means disposed between the main feeder section and each of said supplemental sections, said wall means having openings substantially below the surface of the glass in said sections whereby the molten glass in said supplemental sections flows through the openings into the main feeder section, and a perforated heater strip disposed in the main feeder section adapted to be electrically heated to increase the temperature of the glass adjacent the heater strip, the floor of the feeder having a plurality of orificed projections through which flow streams of glass from the feeder.

References Cited

UNITED STATES PATENTS

| 2,465,283 | 3/1949 | Schlehr | 65—1 |
| 2,794,058 | 5/1957 | Russell | 13—6 |
| 3,012,373 | 12/1961 | Willis | 65—1 X |

DONALL H. SYLVESTER, *Primary Examiner.*

R. L. LINDSAY, *Assistant Examiner.*